United States Patent [19]
Hardie

[11] Patent Number: 5,774,174
[45] Date of Patent: Jun. 30, 1998

[54] LASER PROJECTOR

[76] Inventor: Robert Joseph Hardie, 1055 Shawnmarr Road, Mississauga, Ontario, Canada, L5H 3V2

[21] Appl. No.: 598,229

[22] Filed: Feb. 7, 1996

[51] Int. Cl.[6] .................................................. H04N 7/00
[52] U.S. Cl. ................................ 348/38; 348/750; 353/94
[58] Field of Search .............................. 348/36–39, 750, 348/756, 740, 903, 904, 564, 565, 561, 588; 353/94, 30, 48, 82, 89; 434/286, 287, 284, 285; 359/641, 618; H04N 7/00, 5/74

[56] References Cited

U.S. PATENT DOCUMENTS

| | | | |
|---|---|---|---|
| 3,650,608 | 3/1972 | Baker | 350/320 |
| 3,708,616 | 1/1973 | Von Felgel | 178/5.4 R |
| 3,851,951 | 12/1974 | Winzer | 353/38 |
| 3,992,718 | 11/1976 | Driskell | 358/61 |
| 4,111,536 | 9/1978 | Taylor | 352/132 |
| 4,297,723 | 10/1981 | Whitby | 358/60 |
| 4,355,328 | 10/1982 | Kulik | 434/43 |
| 4,417,253 | 11/1983 | Jacks | 346/17 |
| 4,473,355 | 9/1984 | Pongratz | 434/44 |
| 4,656,506 | 4/1987 | Ritchey | 353/82 |
| 4,720,747 | 1/1988 | Crowley | 358/231 |
| 4,833,528 | 5/1989 | Kobayashi | 358/53 |
| 4,851,918 | 7/1989 | Crowley | 358/231 |
| 4,942,566 | 7/1990 | Godard | 369/113 |
| 4,978,202 | 12/1990 | Yang | 350/331 R |
| 5,026,152 | 6/1991 | Sharkey | 352/85 |
| 5,117,221 | 5/1992 | Mishica, Jr. | 340/556 |
| 5,136,426 | 8/1992 | Linden et al. | 359/583 |
| 5,253,073 | 10/1993 | Crowley | 358/231 |
| 5,272,473 | 12/1993 | Thompson et al. . | |
| 5,317,348 | 5/1994 | Knize | 353/31 |
| 5,327,182 | 7/1994 | Kohut et al. | 352/27 |
| 5,381,258 | 1/1995 | Bordignon et al. | 359/202 |
| 5,386,244 | 1/1995 | Gai | 348/610 |
| 5,492,474 | 2/1996 | Hattori | 434/286 |

*Primary Examiner*—Michael H. Lee
*Attorney, Agent, or Firm*—Donald E. Hewson

[57] ABSTRACT

A laser light based image projection apparatus and method for projecting full color moving images comprising a plurality of color daub components onto a remote viewing screen comprises a source of digital image data in the form of inter-related color position co-ordinates and color intensity values at any instant in time, which digital image data are analyzed by a color value analyzer to derive therefrom specific red, blue, and green color intensity components and specific red, blue, and green color position co-ordinates. Time-based laser intensity control signals, time-based directional control signals, specific laser addresses, and projection timing parameters are calculated, and are used to produce laser actuation signals that control narrow diameter beam red, blue, and green lasers, to control optically adjusted wide diameter beam red, blue, and green lasers, and to control optically adjusted very wide diameter beam red, blue, and green lasers. The time-based directional control signals are received by a laser beam deflector and are used to direct each beam of laser light to its intended location on the remote viewing screen, so as to form corresponding color daub components. The color daub components combine together in an overlapping manner to form full color moving images. The apparatus and method of the present invention also provide the versatility of projecting an image of virtually any type onto a viewing screen that may be either a flat, curved or spherical, and be of virtually any size.

10 Claims, 9 Drawing Sheets

LASER PROJECTOR

FIELD OF THE INVENTION

This invention relates to a laser light based image projection apparatus for projecting full color moving images comprising a plurality of color daub components onto a remote visible-light retransmissive viewing screen, using pluralities of red, blue, and green lasers arranged in specified groups, and more particularly to a laser light based image projection apparatus where the plurality of color daub components overlap one another on the viewing screen.

BACKGROUND OF THE INVENTION

In the field of recreating moving images on a viewing screen, for viewing by an audience, there are basically two different well known technologies. One technology is that of motion picture film, which involves projecting light through a tinted translucent film onto a remote viewing screen. The other technology is that of television, in which a raster scanning method is incorporated into any one of a number of different technologies to form an image on a local or remote viewing screen.

Both of these technologies are now several decades old and accordingly have fundamental technological limitations, and thus tend to fall short of expectations of what is possible in terms of entertainment, in view of the level of sophistication of presently available modern technology.

Film technology is in the order of one hundred years old and, although many advancements have been made during that time, to a point where the technology is generally acceptable in terms of quality, it still relies on the same basic fundamental principles of operation as it did a century ago. Namely, original images are represented as a series of picture images on a strip of film. Essentially, the film is tinted so as to have the required coloring. The film is run at a relatively high rate of speed through a delicate mechanical projecting device. Intense white light is shone through each one of these frames, one after another in quick succession, toward a remote viewing screen. The tinting of the film provides the necessary color adjustment to the white light so as to provide a properly colored image on the viewing screen. The successive frames are "shown" at a rapid enough rate—typically 16 to 24 frames per second—that the images presented frame-by-frame on the remote viewing screen appear to be moving over a series of frames.

Film technology does provide a means for producing a relatively high resolution, accurately colored image on a remote viewing screen. Conventional screens can be of nearly any size from about a couple of square feet to a few thousand square feet, and are relatively unsophisticated as almost any generally smooth white surface, either flat or slightly curved, will suffice as a suitable remote viewing screen. Motion picture projection screens typically have a beaded surface with highly reflective properties, so that a brighter picture may be viewed. Generally, however, motion picture viewing screens are typically relatively inexpensive for their size.

In spite of film technology's wide acceptance, it has many disadvantages and limitations associated with it. Due to the fact that the projected image on the viewing screen is many times larger than the actual frames of the film, there may be limited resolution, which results in a grainy picture being viewed. Further, due to the fact that the film is continuously moving and light is being flashed through each successive frame, at a rate of several times per second, each frame may not be precisely in register with adjacent frames. Accordingly, a still image on the film may tend to move slightly, usually in a vertical sense, on the remote viewing screen. Considering the amount of magnification that occurs between the film and the image on the remote viewing screen, a minute change in vertical register of successive frames of the film, as caused by imperfect timing of the gate mechanism, can cause a change of perhaps a few inches on the viewing screen. Further, the film is a set physical entity—that is to say that it cannot be changed without physically cutting and splicing it in a production studio. The color cannot be altered except for the use of external coloring filters that alter the color of the entire frame. In order to deliver the film from an originating location to a movie theatre or the like, the film must be physically transported, which transportation may take several days if the film is to travel between distant countries. Films also experience physical degradation over time, and can also break during use. Further, the visual image on the film cannot be "color adjusted" to compensate for unpredictable screen conditions or other factors. Considering the disadvantages and limitations associated with film technology, there is a lack of a superior means for producing a large motion picture image on a remote viewing screen.

Television technology is mostly suitable for smaller sized audiences and is used throughout the world for displaying dynamic visual images generated from either a local or a remote source. Television technology uses a raster scan method, wherein an electron beam is passed along a plurality of parallel horizontal paths, in sequence, so as to excite red, blue, and green components of a phosphorescent screen. The color, contrast, and brightness are readily adjustable on an overall basis, thus allowing for fine adjustment of the picture produced by any television. The image quality is sufficient, although not exceptional, for small viewing screens —that is to say, up to perhaps about five square feet in area, and is relatively inexpensive; however, it does have disadvantages and limitations associated with it. The phosphorescent screen tends to be expensive and must have a clear front lens—glass screen—in order to be viewable. In order to have a viewing screen of more than a few square feet in area, the resolution would be questionable, and the expense would be prohibitive. Realistically, the maximum size of the viewing screen is a few square feet in area, thus precluding televisions from being suitable for viewing by large audiences.

In order to create a larger remote viewing screen with cathode ray tube technology television, it is possible to form a matrix of electronically interconnected television screens juxtaposed one to the other. Special computer technology is used to allocate the video image signal to these interconnected televisions, with an appropriate portion of the signal being routed to each television screen. The composite image from each of the separate television monitors is equivalent to the image that would be seen on a single television screen using conventional single screen technology. The disadvantages of this technology include prohibitively high cost and the presence of edge lines between the juxtaposed television screens.

Somewhat larger television viewing screens are possible by using projection screen technology, wherein three high brightness cathode ray tubes, or light-valves, each provide a primary color; namely, red, blue, and green. The cathode rays are projected through a folded mirror system onto a translucent screen. Alternatively, for front projection televisions, focused cathode ray tubes or light-valves can be used to project television images onto much larger viewing screens, even up to several feet across. Projection television technology has several disadvantages associated with it, including poor quality of picture, and a limited viewing angle—viewing is distorted and dim from oblique angles. The maximum size of screen for use with front projection television technology is in the order of about twenty feet or so, measured diagonally. Accordingly, projection television technology is suitable for viewing by large audiences; however, the projection system required for such a large size viewing screen is extremely expensive.

More recently developed modern video technology provides other imaging processes that permit the reproduction of an original color image on a television screen, such as an active matrix color screen commonly used in light-weight portable computers; however, this and other similar modern developments are generally suitable for conventional sized televisions only, and are totally unsuitable for reproducing larger images.

Other types of televisions where the three color grid is represented by small light bulbs are known. Such screens are typically found in sports stadiums and are used as score boards and instant replay screens. However, such television screens are typically very expensive and have limited resolution and, therefore, would be generally unacceptable for the viewing of movies or similar.

Television technology relies on a specific type of viewing screen having a coating of phosphorus on one side of a clear transparent plate, which realistically has a maximum size too small for viewing by large audiences, whereas film technology needs only a flat or slightly concave generally white surface, which can be made to virtually any size. Any technology for displaying large sized video images would need to use such generally white viewing screens, such as those used for viewing films, in order to be cost effective.

One technology that is currently being developed to produce images on a remote viewing screen or the like, is laser technology. Laser light shows, wherein laser beams are used to create images on a remote surface in synchronization with music have been known for many years. Further, there are presently known a number of laser based imaging systems where three colors (red, blue, green) of laser are used to form images. Various of these laser based imaging systems will now be discussed.

DESCRIPTION OF THE PRIOR ART

Various types of laser light based imaging projecting apparatus are presently available. Most such apparatus use a raster scan technology analogous to the raster scan technology used in electron beam video displays, such as televisions.

Both U.S. Pat. No. 4,720,747 to CROWLEY (issued Jan. 19, 1988) and U.S. Pat. No. 4,851,918, also to CROWLEY (issued Jul. 25, 1989) disclose sequential plane projection by laser video projector, in which three lasers, each emitting a different color of light, are directed into an optical system including two cylindrical, anamorphic lenses. The anamorphic lenses compress the monochromatic light from the laser beams into a narrow set of parallel rays. These rays are introduced into a suitable anisotropic acoustic-optical light modulating device. The anisotropic acoustic-optical light modulating device has a transducer mounted on a side non-collinear to the path of the laser beams. A wave absorber is mounted on an other side of the anisotropic acoustic-optical light modulating device facing the side of the anisotropic acoustic-optical light modulating device upon which the transducer is mounted. Acoustic waves are propagated between the transducer and the absorber. The acoustic waves respond to signals from a radio frequency source connected to the transducer. The modulated output beam is transmitted to a cylindrical anamorphic lens used for output projection. The lens focuses the modulated light beam into a beam passing through an optical slight positioned to block under-refracted light from exiting the anisotropic acoustic-optical light modulating device. The light beam emitting from the slit is projected onto a frame scanning mirror. The frame scanning mirror causes the resulting narrow beam of laser light to scan across horizontal scan lines of a projection screen sequentially to form a video image.

U.S. Pat. No. 4,978,202 to YANG discloses a laser scanning system for displaying a three-dimensional color image. Red, blue, and green lasers are used to produce an image on a liquid crystal plate placed between polarized light plates, using a raster scan technique. The scanning system used to the scan the laser beam onto a screen includes a liquid crystal plate, a first reflecting mirror, a galvanometer, first and second lenses, a rotating mirror, and a second reflecting mirror.

U.S. Pat. No. 4,297,723 to WHITBY discloses a wide angle laser display system wherein three laser beams are each aimed to one third of a display screen using conventional scanner technology. The laser beams are reflected off a rotating multi-faceted polygonal mirror, through a relay lens and then reflected off a mirror of a horizontal low speed scanner, through a projection lens system and to a screen, so as to form essentially the pattern of a television raster.

U.S. Pat. No. 5,272,473 to THOMPSON et al discloses a reduced speckled display system wherein red, blue, and green laser light beams are projected through a beam expander, arc reflected off a mirror to a spatial light modulator. The spatial light modulator projects a portion of the expanded laser light beams to a large display screen to form a plurality of illuminated pixels. This system is not a raster scan system, but is instead essentially a "discrete element" system, where the small mirrors of the spatial light modulator determine whether light from the lasers hits a corresponding pixel, or not. The deformable mirror devices of the spatial light modulator are deflected by means of electrical signals from a computer.

The laser projection systems found in the prior art basically suffer from two problems: Firstly, they are inefficient in terms of use of laser light power. Secondly, the image quality is inadequate compared to film technology.

It is therefore an object of the present invention to provide a laser light based image projection apparatus for projecting high quality full color moving images, such as perhaps a computer simulation or a motion picture, and so on, onto a remote viewing screen of size suitable for viewing by a large audience.

SUMMARY OF THE INVENTION

In accordance with one aspect of the present invention, there is provided a laser light based image projection apparatus for projecting full color moving images comprising a plurality of color daub components onto a remote visible-light retransmissive viewing medium, such as a viewing screen, using pluralities of red, blue, and green lasers, each laser emitting a respective red, blue, or green laser light beam, the lasers being arranged in specified groups. The apparatus comprises a source of digital image data that provides the digital image data for the full color moving images in the form of inter-related color position co-ordinates and color intensity values at any instant in time. A conversion computer is connected in data communicating relation to the source of the digital image data to receive the digital image data in the form of the inter-related color position co-ordinates and color intensity values from the source. A color value analyzer within the conversion computer analyses the color position co-ordinates and color intensity values and derives therefrom specific red, blue, and green color intensity components and specific red, blue, and green color position co-ordinates. A control-data calculator within the conversion computer calculates laser light beam intensity data, laser light beam positioning data, and data distribution addresses, based on the specific red, blue, and green color intensity components and specific red, blue, and green color position co-ordinates, and formats the calculated data and distribution addresses into distinct data packets. At least one local computer is connected in data communicating relation to the control-data calculator for receiving the distinct data packets from the control-data calculator. An intensity calculator in the at least one local computer calculates time-based laser intensity control signals based on the received laser light beam intensity data. A positioning calculator in the at least one local computer calculates time-based directional control signals based on the received laser light beam positioning data. A routing calculator in the at least one local computer determines specific laser addresses based on said received data distribution addresses, so as to direct to specific laser addresses therefor, and determines the time-based laser intensity control signals and the time-based directional control signals, at any instant in time. A timing calculator in the at least one local computer calculates projection timing parameters based on said received laser light beam intensity data, said received laser light beam positioning data, and said received data distribution addresses, so as to determine the starting time and the time period of operation of the lasers at each respective laser address, and communicates time-based laser intensity control signals thereto. A laser intensity controller is connected in data communicating relation to each the at least one local computer and receives the time-based laser intensity control signals therefrom so as to produce laser actuation signals based on the time-based laser intensity control signals. Narrow diameter beam red, blue, and green lasers, each having a discrete address, are connected in electrically conductive relation to each laser intensity controller so as to receive laser actuation signals therefrom, each first laser emitting a narrow diameter laser beam under the control of the laser actuation signals. Optically adjusted wide diameter beam red, blue, and green lasers, each having a discrete address, are connected in electrically conductive relation to each laser intensity controller so as to receive laser actuation signals therefrom, each second laser emitting an optically adjusted wide diameter laser beam under the control of the laser actuation signals. A plurality of first digital-to-analogue convertors are connected in data communicating relation to each local computer so as to receive the time-based directional control signals and convert the time-based directional control signals to corresponding analogue directional control signals. A plurality of laser beam deflectors are connected in electrically conductive relation to the first digital-toanalogue convertor so as to receive the analogue directional control signals therefrom and to direct each respective beam of laser light to its intended location on the remote viewing screen, so as to form corresponding color daub components, the color daub components combining together one with another in a generally overlapping manner, thus forming the full color moving images.

In accordance with another aspect of the present invention, there is provided a method of projecting full color moving images comprising a plurality of color daub components onto a remote visible-light retransmissive viewing screen, using pluralities of red, blue, and green lasers, each laser emitting a respective red, blue, or green laser light beam, the lasers being arranged in specified groups, the method comprising the steps of:

providing the digital image data for the full color moving images in the form of inter-related color position co-ordinates and color intensity values at any instant in time;

receiving into a conversion computer the digital image data in the form of the inter-related color position co-ordinates and color intensity values from the source;

analyzing the color position co-ordinates and color intensity values and to derive therefrom specific red, blue, and green color intensity components and specific red, blue, and green color position co-ordinates;

calculating laser light beam intensity data, laser light beam positioning data, and data distribution addresses, based on the specific red, blue, and green color intensity components and specific red, blue, and green color position co-ordinates, and formatting the calculated data and distribution addresses into distinct data packets;

receiving into at least one local computer the distinct data packets from the control-data calculator;

calculating time-based laser intensity control signals based on the received laser light beam intensity data;

calculating time-based directional control signals based on the received laser light beam positioning data;

determining specific laser addresses based on said received data distribution addresses, so as to direct to specific laser addresses therefor, the time-based laser intensity control signals and the time-based directional control signals, at any instant in time;

calculating projection timing parameters based on said received laser light beam intensity data, said received laser light beam positioning data, and said received data distribution addresses, so as to determine the starting time and the time period of operation of the lasers at each respective laser address, and to communicate time-based laser intensity control signals thereto;

receiving into a laser intensity controller the time-based laser intensity control signals therefrom so as to produce laser actuation signals based on the time-based laser intensity control signals;

receiving into narrow diameter beam red, blue, and green lasers, each having a discrete address, the laser actuation signals, and actuating each of the narrow diameter beam lasers so as to emit a narrow diameter laser beam under the control of the laser actuation signals;

receiving into optically adjusted wide diameter beam red, blue, and green lasers, each having a discrete address, the laser actuation signals, and actuating each of the optically adjusted wide diameter beam red, blue, and green lasers so as to emit an optically adjusted wide diameter laser beam under the control of the laser actuation signals;

receiving into first digital-to-analogue convertors the time-based directional control signals and converting the time-based directional control signals to corresponding analogue directional control signals; and receiving into laser beam deflectors the analogue directional control signals therefrom, and directing, using the laser beam deflector, each respective beam of laser light to its intended location on the remote viewing screen, so as to form corresponding color daub components, the color daub components combining together one with another in a generally overlapping manner, thus forming the full color moving images.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
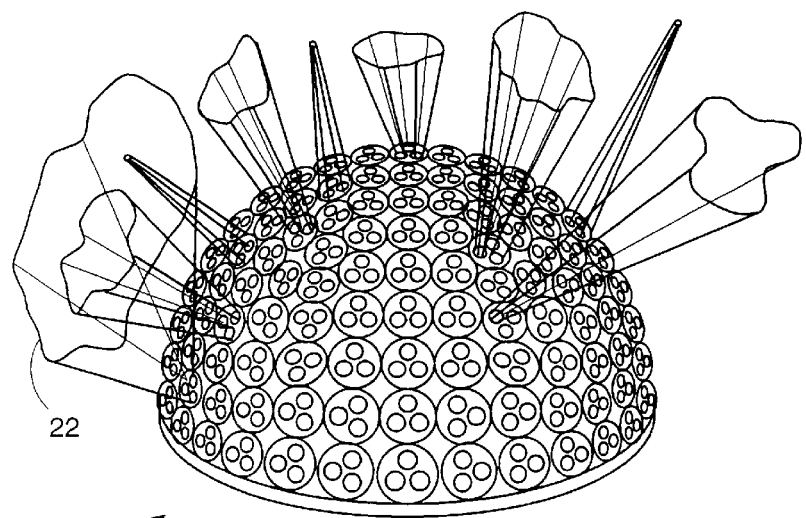
FIG. 1 is a perspective view of a first preferred embodiment of the laser light based image projection apparatus of the present invention projecting a full color moving image onto a remote viewing screen.
Figure 2:
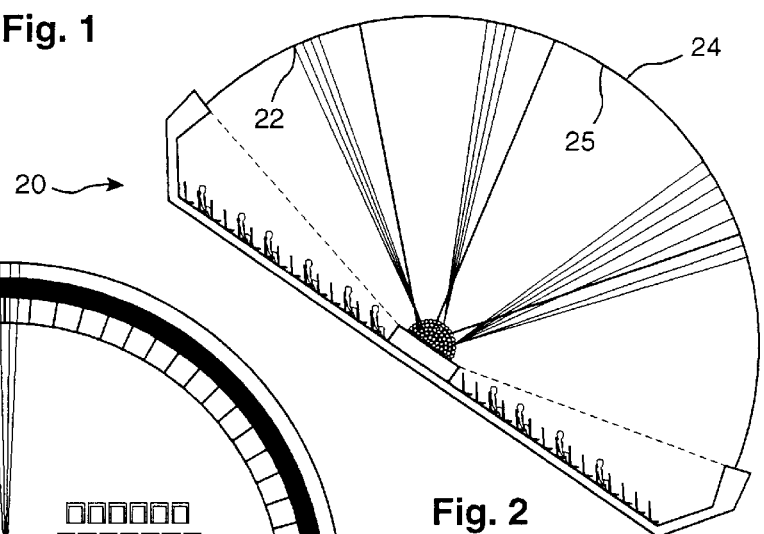
FIG. 2 is a side sectional view of the preferred embodiment of the laser light based image projection apparatus of FIG. 1, projecting a full color moving image onto a remote viewing screen.
Figure 3:
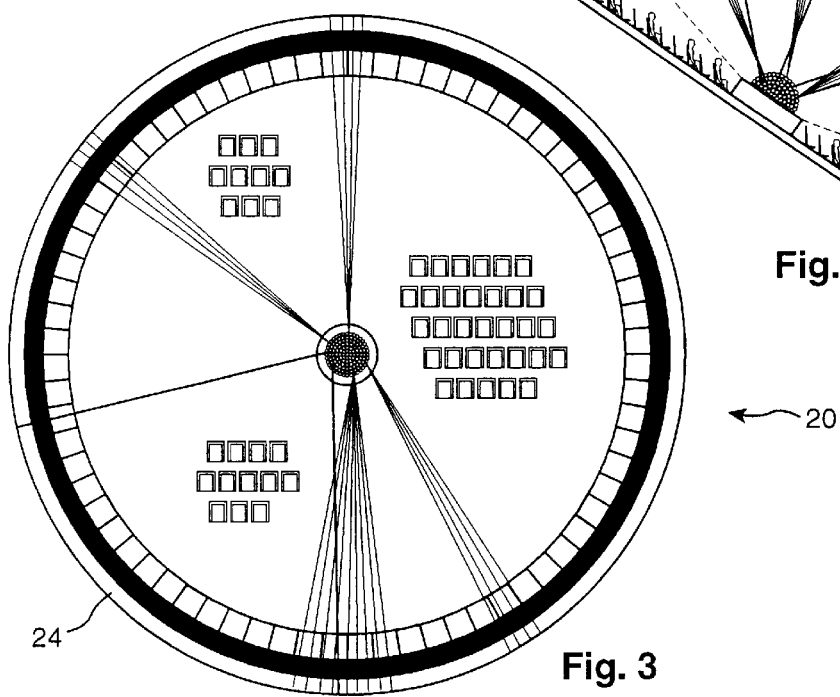
FIG. 3 is a top plan sectional view of the preferred embodiment of the laser light based image projection apparatus of FIG. 1, projecting a full color moving image onto a remote viewing screen.

Reference will now be made to FIGS. 1 through 7H, which illustrate a preferred embodiment of the present invention. A laser light based image projection apparatus 20, for projecting full color moving images 22 onto a remote visible-light retransmissive medium, such as viewing screen 24, is shown. The surface 25 of the visible-light retransmissive viewing screen 24 is typically a conventional white viewing screen surface, as is well known in the industry, or may be any suitable type of white or near white screen, among others, as desired. Typically, viewing screens have a matte finish or a lenticular finish in order to reduce direct reflections and glare. The viewing screen 24 may be in the form of a conventional flat screen, or may be a curved screen, or may even be a hemispheric type screen such as is typically found in a planetarium and as is shown in FIGS. 1 through 3. Further, the screen might be in the form of a globe with internal lasers. In this case, it is likely that the actual physical lasers might be remote to the globe with the laser light being carried into the globe by means of fiber optics. Another type of viewing medium that could be employed is a smoke screen wherein amounts of white smoke are continuously released into a selected area so as to form a somewhat flat faced surface suitable for receiving laser light so as to produce a viewable image thereon.

The full color moving images 22 projected onto the viewing screen 24 comprise a plurality of color daub components 85, 95, 105 formed by means of a plurality of red 80R, 90R, 100R, blue 80B, 90B, 100B, and green 80G, 90G, 100G lasers, with each laser emitting a respective red 84R, 94R, 104R, blue 84B, 94B, 104B, or green 84G, 94G, 104G laser light beam.

In the preferred embodiment, the lasers are arranged in specific groups—called "pods"—with three lasers per pod: one red laser, one blue laser, and one green laser. Further, a number of pods 29 may form a larger pod group. Through the connecting together of these pods 29 into specifically arranged formations, it is possible to provide imaging onto a variety of shapes and sizes of viewing screens. For instance, certain arrangements of pods 29 would be used for flat screens, while other arrangements of pods 29 would be used for curved screens. It is envisioned for large projection systems, such as might be found in an amphitheatre, for instance, the laser light based image projection apparatus 20 of the present invention would have about twenty pod groups with about twenty pods 29 per group.

In overview, as can be best seen in FIGS. 1 through 4, the laser light based image projection apparatus 20 comprises, in a first preferred embodiment, a source of digital image data 30, such as a computer data file as found on a laser disk or a video tape, or as stored in a remote computer. The source of digital image data 30 has operatively connected to it a conversion computer 40 which is essentially a central processing unit. Typically the CPU 40 is a mini-computer, but may be a mainframe computer or a powerful microcomputer, as necessary. The CPU 40 is, in turn, operatively connected to at least one local computer comprising a plurality of intermediately connected routing microcomputers 50, which are connected in data communicating relation to the CPU 40, and comprises a plurality of laser-controlling microcomputers 60 connected in data communicating relation to each of the plurality of intermediately connected routing microcomputers 50. Each of the routing microcomputers 50 oversees its own large pod group, and therefore will be subsequently referred to as a group processor 50. For a projection apparatus 20 having four hundred pods 29, there would be twenty pod groups with twenty pods in each group. Accordingly, there would be twenty group processors 50 connected to the CPU 40. Further, there would be twenty laser controlling microcomputers 60 connected in data communicating relation to each group processor 50. Each of the laser controlling microcomputers 60 controls the actions of all of the other equipment in its pod 29, and therefore will subsequently be referred to as a pod processor 60. In the preferred embodiment, each of the three levels of processing—namely the CPU 40, the group processors 50, and the pod processors 60—have well defined responsibilities for data handling, error processing, system functions, and so on. However, it is envisioned that in other embodiments, such responsibilities may differ from that in the preferred embodiment as described, and may be flexibly allocated in order to maximize efficiency.

Three colors lasers, namely red, blue, and green, are used in the preferred embodiment of the projection apparatus 20, and are designated by one of the letters "R", "B", and "G" after an appropriate reference numeral. Further, three beam widths of lasers are used in the preferred embodiment, namely narrow diameter beam lasers as designated by the reference numeral 80, optically adjusted wide diameter beam lasers as designated by the reference numeral 90, and optically adjusted very wide diameter beam lasers as designated by the reference numeral 100. Accordingly, there is a narrow diameter beam red laser that emits a narrow diameter red laser beam 84R, a narrow diameter beam blue laser that emits a narrow blue laser beam 84B, a narrow diameter beam green laser that emits a narrow diameter green laser beam 84G, an optically adjusted wide diameter beam red laser 90R that emits an optically adjusted wide diameter red laser beam 94R, an optically adjusted wide diameter beam blue laser 90B that emits an optically adjusted wide diameter blue laser beam 94B, an optically adjusted wide diameter beam green laser 90G that emits an optically adjusted wide diameter green laser beam 94G, an optically adjusted very wide diameter beam red laser 100R that emits an optically adjusted very wide diameter red laser beam 104R, an optically adjusted very wide diameter beam blue laser 100B that emits an optically adjusted very wide diameter blue laser beam 104B, and an optically adjusted very wide diameter beam green laser 100G that emits an optically adjusted very wide diameter green laser beam 104G.

One of each of the three colors of lasers, namely red, blue and green, are connected to each pod processor 60 through a respective laser intensity controller 70R, 70B, and 70G. Typically, each pod 29 has only one beam width of laser, either narrow 80, wide 90, or very wide 100.

Within the field of color projection, and more specifically color theory, it is well known that virtually any desired color can be created by using specific combinations of the colors red, blue and green. With this in mind, the present invention will be shown to take better advantage than the prior art at combining component colors to form desired colors. By controlling the intensity, firing duration and beam diameter of the component colors red, blue and green, the present invention provides greater versatility in terms of combining colors.

The laser intensity controllers 70R, 70B, and 70G are each preferably in the form of a second digital-to-analogue convertor, in order to permit infinitesimally fine control of the various narrow, wide, or very wide lasers 80R, 80B, 80G, 90R, 90B, 90G, 100R, 100B, 100G, but may alternatively produce a digital output, if the lasers 80R, 80B, 80G, 90R, 90B, 90G, 100R, 100B, 10G, are configured accordingly.

Also in each pod 29, three laser beam deflectors 120R, 120B and 120G, one for each laser in a pod 29, are connected to each pod processor 60 through a respective first digital-to-analogue convertor 110R, 110B, and 110G.

The combination of a pod processor 60, one set of red (80R, 90R, or 100R), blue (80B, 90B, or 100B), and green (80G, 90G, or 100G), lasers, three laser intensity controllers 70R, 70B, 70G—one for each laser, three laser beam deflectors 120R, 120B, 120G—one for each laser, and three first digital-to-analog convertors 110R, 110B, 110G—one for each laser, together can be considered as a separate pod 29. There is a plurality of pods 29; typically, anywhere from a few pods 29 to perhaps several hundred pods 29 are used. Generally, each pod 29 is substantially similar to any other pod 29, except for the width of laser beam 84, 94, 104 emitted from each of the three lasers 80, 90, 100 of the pod 29. One pod type will have narrow diameter beam lasers 80R, 80B, 80G, another pod type will have optically adjusted wide diameter beam lasers 90R, 90B, 90G, and yet another pod type will have optically adjusted very wide diameter beam lasers 100R, 100B, 100G. It is also quite possible that some pods 29 will differ from this particular format.

Figure 4:
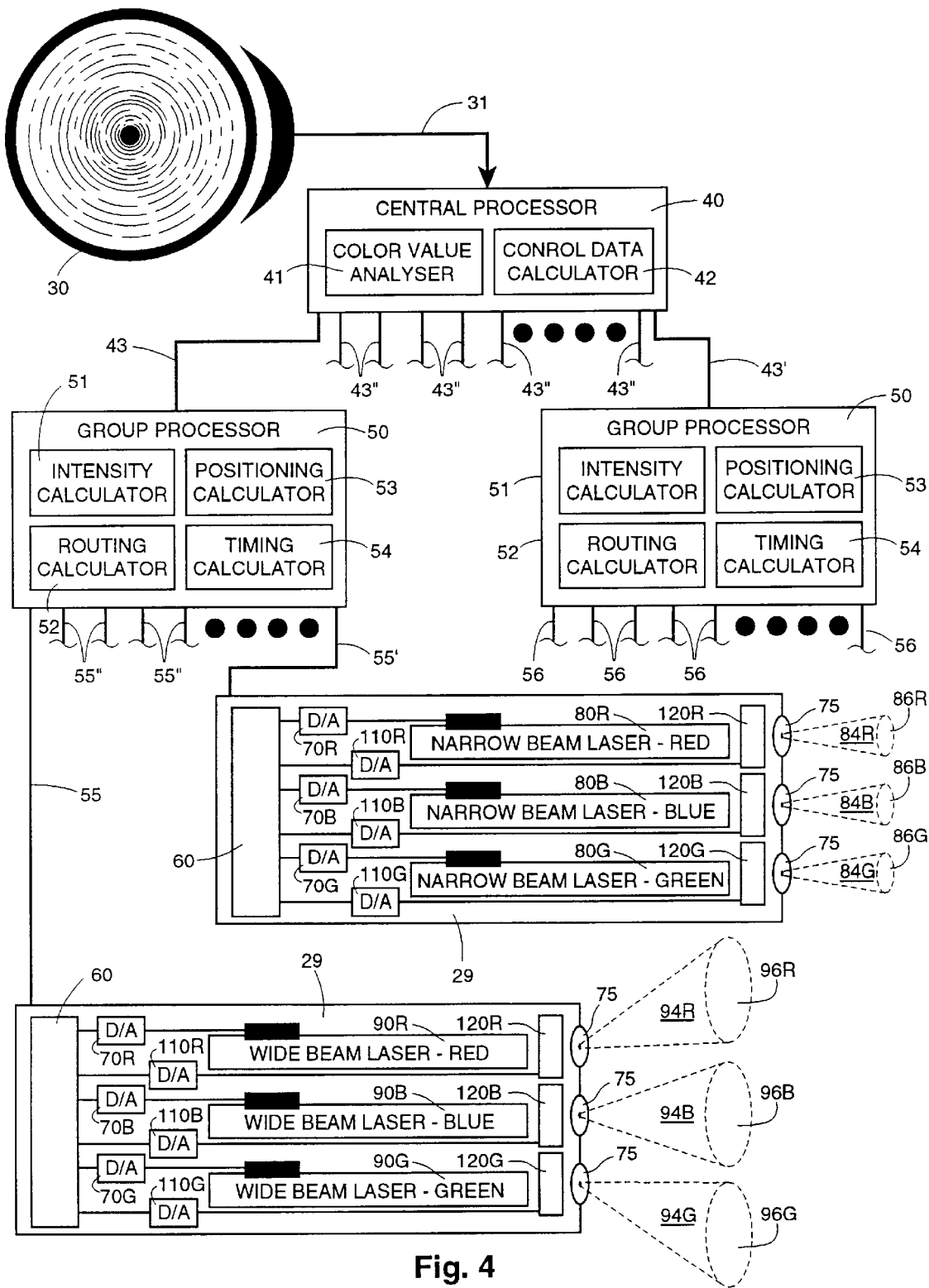
FIG. 4 is a diagrammatic view of the first preferred embodiment of the laser light based image projection apparatus of the present invention as shown in FIG. 1.

The preferred embodiment of the laser light based image projection apparatus 20 of the present invention will now be discussed in detail with specific reference to FIGS. 1 through 7H. The preferred embodiment of the laser light based image projection apparatus 20 comprises a source of digital image data, which source may be a laser disk 30 as shown in FIG. 4, or perhaps a video tape, or the like, such as a remotely transmitted signal received by a satellite or over a telephone network or the like, or a remote computer transmitting over a computer communications network, among others. The digital image data 30 are in the form of inter-related color position co-ordinates and color intensity values at any instant in time. The various position of each color at any instant in time is represented by inter-related color position co-ordinates. The amount or intensity of each of the red, blue, and green color laser light components is represented by a color intensity value. Each of the inter-related color position co-ordinates and the color intensity component values is represented as a piece of digital image data.

The CPU 40 is connected in data communicating relation to the source of digital image data 30, by means of connector cables 31, to thereby receive the digital image data in the form of red, blue, and green inter-related color position co-ordinates and color intensity values. A color value analyzer 41 within the CPU 40 analyses the inter-related color position co-ordinates and color intensity values and derives therefrom specific red, blue, and green color intensity components and specific red, blue, and green color position co-ordinates. A control data calculator 42 within the CPU 40 calculates laser light beam intensity data, laser light beam positioning data, and data distribution addresses for routing data to specific group processors 50 and specific pod processors 60, based on the specific red, blue, and green color intensity components and specific red, blue, and green color position co-ordinates calculated by the CPU 40.

The determination of such parameters is based on using continuous beams of laser light from the narrow diameter beam red lasers 80R, narrow diameter beam blue lasers 80B, narrow diameter beam green lasers 80G, optically adjusted wide diameter beam red lasers 90R, optically adjusted wide diameter beam blue lasers 90B, optically adjusted wide diameter beam green lasers 90G, optically adjusted very wide diameter beam red laser 100R, optically adjusted very wide diameter beam blue laser 100B, and optically adjusted very wide diameter beam green laser 100G, combined in an efficient and useful manner, generally overlapping one with another to form full color moving images 22 on a viewing screen 24.

The laser light beam intensity data ultimately determine the intensity of each individual laser light beams from the narrow diameter beam lasers 80R, 80B, and 80G, the optically adjusted wide diameter beam lasers 90R, 90B, and 90G, and the optically adjusted very wide diameter beam lasers 100R, 100B, and 100G. The laser light beam positioning data ultimately control the positioning, over time, of the narrow diameter beam lasers 80R, 80B, and 80G, the optically adjusted wide diameter beam lasers 90R, 90B, and 90G, and the optically adjusted very wide diameter beam lasers 100R, 100B, and 100G. The position on the viewing screen 24 of each laser beam is independent one from the other; however, the various laser beams 84R, 84B, 84G, 94R, 94B, 94G, 104R, 104B, 104G, are combined together in a generally overlapping manner, as can be best seen in FIG. 6, by each forming respective color daub components 86R, 86B, 86G, 96R, 96B, 96G, 106R, 106B, 106G, that combine together one with another to form a precise multi-colored image on the viewing screen 24. It can be seen that the narrow diameter beam lasers 80R, 80B, and 80G, produce a relatively small color daub component (86R, 86B, 86G) on the viewing screen 24; the optically adjusted wide diameter beam lasers 90R, 90B, and 90G, produce a relatively wide color daub component (96R, 96B, 96G) on the viewing screen 24; and the optically adjusted very wide diameter beam lasers 100R, 100B, and 100G, produce a very wide color daub component (106R, 106B, 106G) on the viewing screen 24.

An important feature of the laser light based image projection apparatus 20 of the present invention is the use of a plurality of diameters of laser beams—namely narrow, wide and very wide—for covering various areas of a viewing screen. It is inefficient to have a narrow diameter beam laser 80 dynamically cover an area of perhaps one square foot as this would involve a substantial amount of data for managing the many changes in direction of the narrow width laser beam 84 over a very short period of time or, alternatively, would require a large number of narrow diameter laser beams 84, each covering a small portion of the one square foot area. Alternatively, an area of one square foot could be covered by perhaps one or a few very wide diameter laser beams 104, which is much more efficient and also more simple in terms of data transfer, laser light beam manipulation, and so on.

The data distribution addresses specify which of the pod processors 60, and therefore ultimately which of the narrow diameter beam lasers 80R, 80B, and 80G, the optically adjusted wide diameter beam lasers 90R, 90B, and 90G, and the optically adjusted very wide diameter beam lasers 100R, 100B, and 100G that the laser light beam intensity data are routed to. Further, the data distribution addresses ultimately control how the laser light beam positioning data are distributed at the laser beam deflector 120R, 120B, 120G.

The calculated laser light beam intensity data, laser light beam positioning data, and data distribution addresses, are formatted into distinct data packets for transmission from the CPU 40 to the various group processors 50. In the preferred embodiment, twenty group processors 50 are connected in data communicating relation to the CPU 40, for receiving the distinct data packets therefrom. As can be best seen in FIG. 4, the group processor 50 that is shown and has pod processors 60 within pods 29 shown as operatively connected thereto, is connected in data communicating relation to the CPU 40 by means of connector cable 43; the group processor 50 that is shown and has pod processors 60 within pods 29 not shown as operatively connected thereto, is connected in data communicating relation to the CPU 40 by means of connector cable 43'; and the group processors 50 that are not shown are connected in data communicating relation to the CPU 40 by means of connector cables 43".

The group processors 50 use an intensity calculator 51 to calculate time-based laser intensity control signals based on the laser light beam intensity data, and also use a positioning calculator 53 to calculate time-based directional control signals based on laser light beam positioning data. A routing calculator 52 in each of the group processors 50 determines specific laser addresses, based on the data distribution addresses received from the control data calculator 42 of the CPU 40. These specific laser addresses are used to direct the time-based laser intensity control signals and the time-based directional control signals to the appropriate pod 29 containing the addressed laser, at any instant in time.

Further, each of the group processors 50 uses a timing calculator 54 for calculating projection timing parameters based on the received laser light beam intensity data, the received laser light beam positioning data, and the received data distribution addresses, so as to determine the starting time and the time period of operation of the lasers at each respective laser address, and to communicate time-based laser intensity control signals to the pod 29 containing the addressed laser.

The time-based laser intensity control signals produced by the intensity calculator 51 control the intensity of the laser light beam emitted from the various lasers in each of the pods 29. The time-based directional control signals produced by the positioning calculator 53 control the ultimate position on the viewing screen 24 of the laser light beam 84, 94, 104 emitted from the various lasers in each of the pods 29. The timing parameters control the timing of the various lasers 80, 90, 100 in each of the pods 29—that is to say that the timing parameters indicate when each laser is to be turned on or off. Further, the timing parameters control the timing of the routing of the time-based laser intensity control signals and the timebased directional control signals, and also synchronize such signals, essentially forming a time marker to allow temporal synchronization of each of the numbers of narrow diameter beam lasers 80R, 80B, 80G, optically adjusted wide diameter beam lasers 90R, 90B, 90G, and optically adjusted very wide diameter beam lasers 100R, 100B, 100G, and the laser beam deflectors 120R, 120B, 120G, in all of the pods 29, one with another.

The time-based laser intensity control signals produced by the intensity calculator 51, and also the time-based directional control signals produced by the positioning calculator 53, and also the laser addresses produced by the routing calculator 52, and also the projection timing parameters calculated by the timing calculator 54, would typically be stored as a data file and, therefore, would only need to be calculated once for any given configuration of image projection and screen combination. The digital image data file containing this information would then be used by the pod processor 60 controlling the laser intensity controllers 70R, 70B, 70G and the first digital to analog convertors 110R, 110B, 110G. In this manner, it would not be necessary to recalculate these various parameters each time, thus providing for efficient use of computer hardware and other hardware.

As can be best seen in FIG. 4, the pod processor 60 in the pod 29 having wide beam lasers, 90R, 90B, and 90G therein is connected in data communicating relation to one group processor 50 by means of connector cable 55; the pod processor 60 in the pod 29 having narrow beam lasers, 80R, 80B, and 80G therein is connected in data communicating relation to the same one group processor 50 by means of connector cable 55'; the pod processors 60 in the pods 29 that are not shown are connected in data communicating relation to the same group processor 50 by means of connector cables 55"; the pod processors in the pods that are connected in data communicating relation to group processors that are not shown, are connected by means of connector cables 56.

The various group processors 50 and pod processors 60 pass back and forth data, current workload status reports, and also can, as a result, share calculation duties so that, for instance, a group processor 50 that has relatively little data to calculate and manipulate can assist with data calculation and manipulation for another group processor 50 that has a large amount of data to calculate and manipulate (such as might occur when a substantial size moving detailed image is to be created).

The three laser intensity controllers 70R, 70B, 70G, one for each of three colors of lasers 80, 90, 100 in a pod 29, are each preferably in the form of a second digital-to-analog converter 70. Each laser intensity controller 70 is connected in data communicating relation to a pod processor 60, for receiving the time-based laser intensity control signals therefrom and producing laser actuation signals based on the time-based laser intensity control signals. One red laser, either 80R, 90R, or 100R, is connected in electrically conductive relation to another one of the laser intensity controllers 70 so as to receive analog laser actuation signals therefrom. Similarly, one blue laser, either 80B, 90B, or 100B, is connected in electrically conductive relation to one of the laser intensity controllers 70 so as to receive analog laser actuation signals therefrom. Also, one green laser, either 80G, 90G, or 100G, is connected in electrically conductive relation to one of the laser intensity controllers 70 so as to receive analog laser actuation signals therefrom. Typically, in any one pod 29, all of the lasers will either be a narrow diameter beam laser 80R, 80B, 80G, an optically adjusted wide diameter beam laser 90R, 90B, 90G, or an optically adjusted very wide diameter beam laser 100R, 100B, 100G.

The laser actuation signals are ultimately sent to the appropriate laser 80R, 80B, 80G, 90R, 90B, 90G, 100R, 100B, 100G, in order to control the intensity of the respective laser light beam 84R, 84B, 84G, 94R, 94B, 94G, 104R, 104B, 104G, emitted by the respective laser, at any instant in time with the intensity ranging from zero to full. The range of intensity may be either continuous or discrete. The intensity of each of the various laser beams 84R, 84B, 84G, 94R, 94B, 94G, 104R, 104B, 104G, is independent one from the other, as controlled by the time-based laser intensity control signals, one control signal per laser.

Each of the narrow diameter beam lasers 80R, 80B, and 80G, emits a narrow diameter laser beam 84R, 84B, and 84G, respectively, under the control of the laser actuation signals. The laser actuation signals control the intensity of each narrow laser beam 84R, 84B, 84G at any instant in time. Further, each of the optically adjusted wide diameter beam lasers 90R, 90B, and 90G, emits a wide diameter laser beam 94R, 94B, and 94G, respectively, under the control of the laser actuation signals. The laser actuation signals control the intensity of each wide laser beam 94R, 94B, 94G, at any instant in time. Also, each of the optically adjusted very wide diameter beam lasers 100R, 100B, and 100G, emits a wide diameter laser beam 104R, 104B, and 104G, respectively, under the control of the laser actuation signals. The laser actuation signals control the intensity of each very wide laser beam 104R, 104B, 104G, at any instant in time.

Figure 5A:
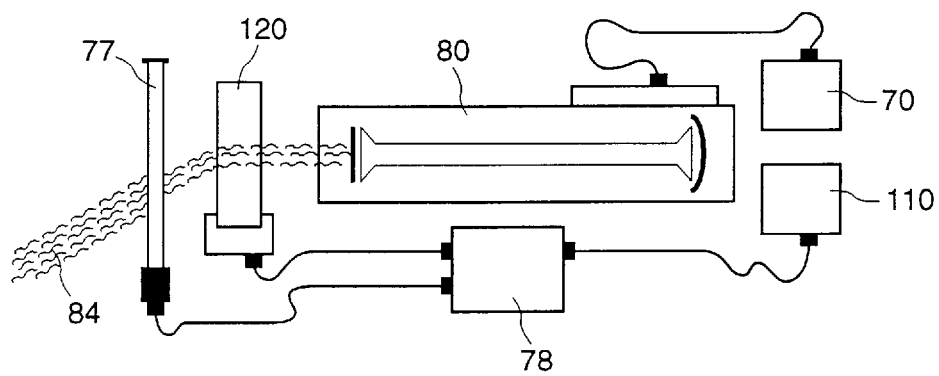
FIG. 5A is a diagrammatic view of a typical laser used in the laser light based image projection apparatus of the present invention, with a complex holographic type of lens.
Figure 5B:
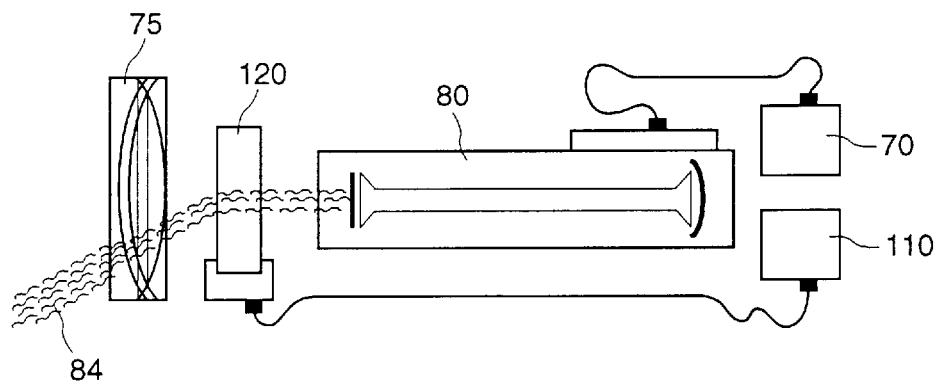
FIG. 5B is a diagrammatic view of a typical laser used in the laser light based image projection apparatus of the present invention, with a glass or plastic type of lens.
Figure 6:
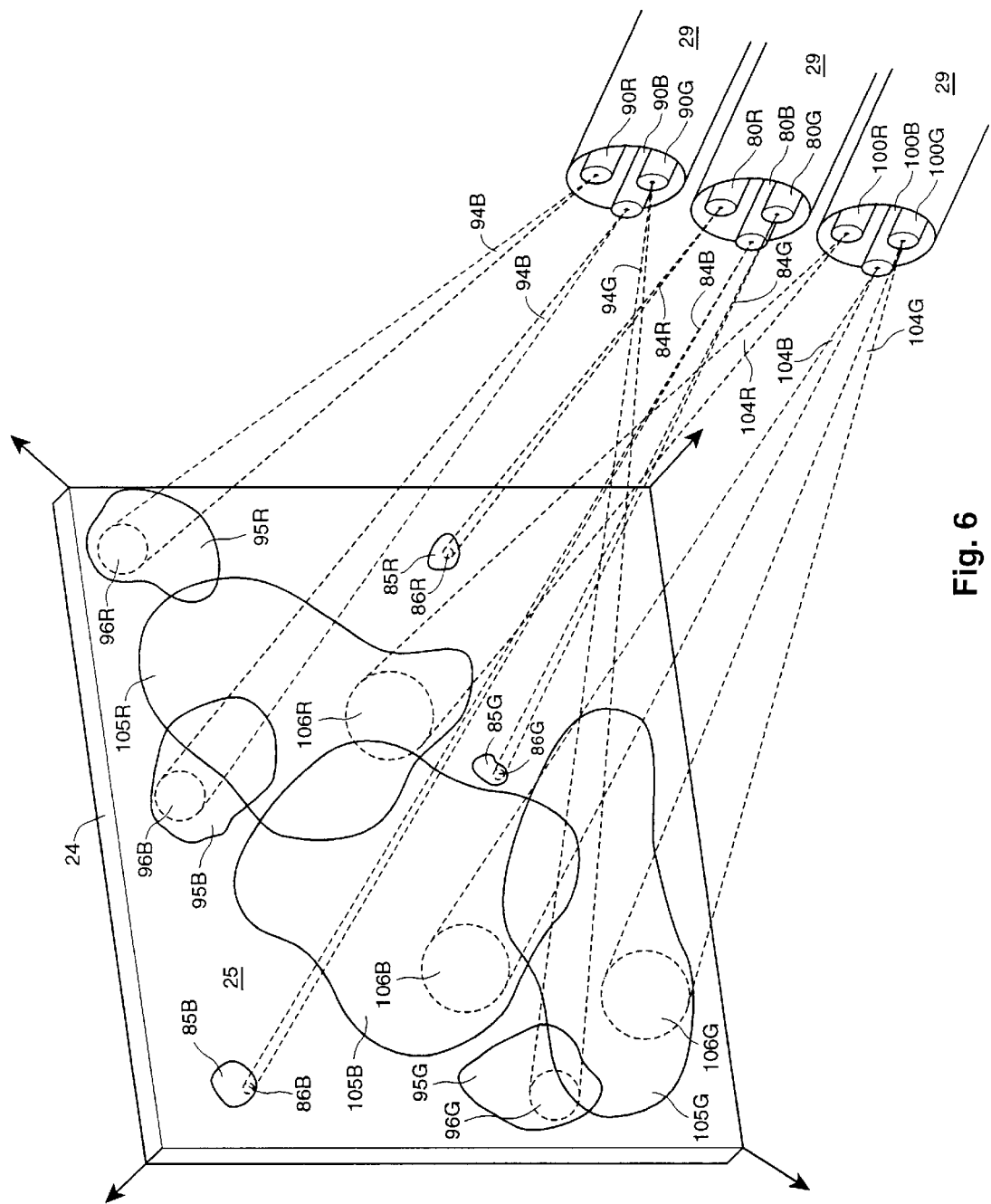
FIG. 6 is a is a simplified perspective view of three pods of the laser light based image projection apparatus of FIG. 1, projecting onto a viewing screen.

The term "optically adjusted wide diameter laser beam" refers to a laser beam that has purposely been optically adjusted by a combination of expander lenses 75, as can be best seen in FIG. 5B, to be of a wider diameter than the narrow diameter laser beams 84R, 84B, 84G. Similarly, the term "optically adjusted very wide diameter laser beam" refers to a laser beam that has purposely been optically adjusted by a combination of lenses to be of a wider diameter than the optically adjusted wide diameter laser beams 94R, 94B, 94G. A holographic lensing system 77, as can be best seen in FIG. 5A, could be used in place of the heavier expander lenses 75, which comprise a plurality of cooperating glass or plastic lenses. A holographic lensing system 77 could provide a beam of laser light having a width anywhere from less than one millimeter to perhaps about two meters, and would require an additional controller 78 to co-ordinate the operation of the lens 77 with the beam deflector 120.

In the laser light based image projection apparatus 20, typically, the narrow diameter beam lasers 80R, 80B, 80G would produce narrow diameter laser beams 84R, 84B, 84G having a diameter of about 0.5 millimeters to about 10 millimeters. Such narrow diameter laser beams 84R, 84B, 84G would typically be used for drawing fine detail, such as text or the details and highlights of a person's face. The optically adjusted wide diameter beam lasers 90R, 90B, 90G would produce optically adjusted wide diameter laser beams 94R, 94B, 94G having a diameter of about 10 millimeters to about 50 millimeters. Such wide diameter laser beams 94R, 94B, 94G would typically be used for drawing the general shape of medium size objects, such as the form of a car or some minor background areas. The optically adjusted very wide diameter beam lasers 100R, 100B, 100G would produce optically adjusted very wide diameter laser beams 104R, 104B, 104G having a diameter of about 50 millimeters to about 200 millimeters. Such very wide diameter laser beams 104R, 104B, 104G would typically be used for overall background coloring or the coloring of large contiguous areas containing a particular color of light.

Three first digital-to-analog convertors 110R, 110B, and 110G are connected in data communicating relation to each of the pod processors 60, so as to receive the time-based directional control signals therefrom—one first digital-to-analog convertor 110R receives the time-based directional control signals for the red laser (80R, 90R, 100R), another first digital-to-analog convertor 110B receives the time-based directional control signals for the blue laser (80B, 90B, 100B), while another first digital-to-analog convertors 110G receives the time-based directional control signals for the green laser (80G, 90G, 100G). The first digital-to-analog convertors 110R, 110B, and 110G convert these time-based directional control signals to corresponding analog directional control signals. The corresponding analog directional control signals are fed to the appropriate of three laser beam deflectors 120R, 120B, and 120G, which laser beam deflectors 120R, 120B, and 120G, are connected in electrically conductive relation to the respective digital-to-analog convertor 110R, 110B, and 110G. Each of the three laser beam deflectors 120R, 120B, and 120G, preferably comprises a lens or mirror mounted on its own piezoelectric element, which piezoelectric element is used to control the angle of inclination of the lens or mirror. The analog directional control signals are used to excite the various piezoelectric elements independently one from the other. In this manner, the laser beam deflectors 120R, 120B, and 120G, receive the analog directional control signals from the respective first digital-to-analog convertors 110R, 110B, and 110G and, accordingly, redirect each beam of laser light 84R, 84B, 84G, 94R, 94B, 94G, 104R, 104B, 104G, to its intended location on the remote viewing screen 24, so as to form corresponding color daub components 86R, 86B, 86G, 96R, 96B, 96G, 106R, 106B, 106G, as can be seen in FIGS. 7A through 7I, and as will be discussed in greater detail subsequently.

The use of the laser light based image projection apparatus 20 of the present invention will now be discussed with reference to FIGS. 6 and 7A through 7I, each of show a portion of the entire viewing screen 24.

Each pod 29 projects through an area having dynamic boundaries 85, 95, 105—that is to say that, unlike raster scanning technologies where each horizontally disposed line is "addressed" distinctly and absolutely, and also unlike some various prior art technologies that essentially shine lasers at distinct "pixels", the laser light based image projection apparatus 20 of the present invention wherein the lasers 80, 90, 100 in each pod 29 can project to any portion of a relatively large area of the surface 25 of the viewing screen 24. In actuality, although each pod 29 can project to anywhere within a relatively large area of the surface 25, most of the time the pods 29 having narrow diameter beam lasers 80R, 80B, 80G would typically cover a relatively small area 85R, 85B, 85G, which relatively small area 85R, 85B, 85G, would change dynamically so as to possibly be anywhere within the large area of possible coverage of the surface 25 for that particular pod 29. Further, the pods 29 having optically adjusted wide diameter beam lasers 90R, 90B, 90G would typically cover a medium size area 95R, 95B, 95G, which medium size area 95R, 95B, 95G, would also change dynamically so as to possibly be anywhere within the large area of possible coverage of the surface 25 for that particular pod 29. The optically adjusted very wide diameter beam lasers 100R, 100B, 100G, would typically cover anywhere from a partial portion to most of the large area of possible coverage in order to provide an overall color base or background for that area. Further, for any given diameter laser, several pods 29 could be projecting in an overlapping manner, as can be best seen in FIG. 6, in any given area at one instant in time and, subsequently, each projecting in other areas at another instant in time and then, again, all projecting in an overlapping manner in a later instant in time.

Figure 7A:
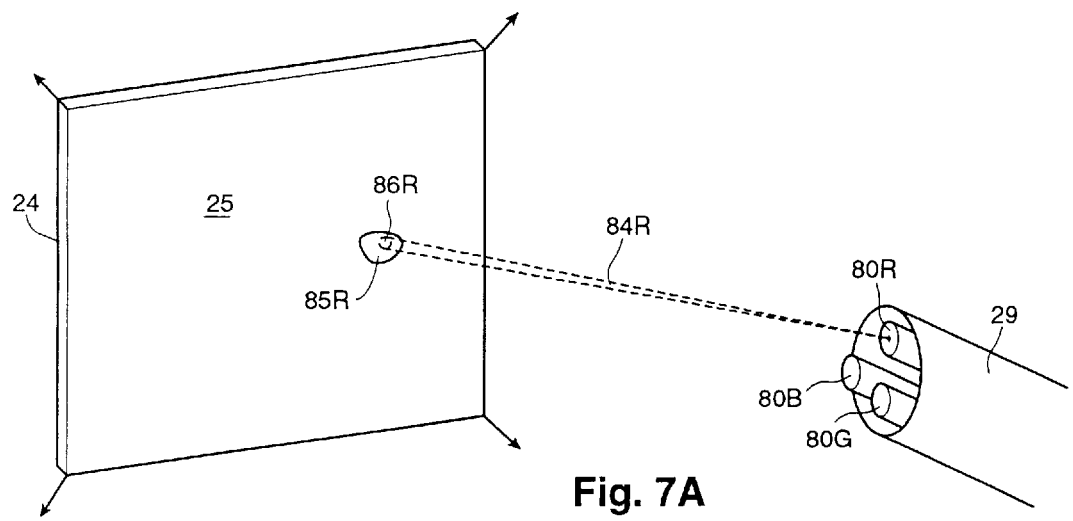
FIG. 7A is a simplified perspective view, similar to FIG. 6, of a portion of the laser light based image projection apparatus of FIG. 1, showing only the narrow diameter laser beam from the red narrow diameter beam laser.
Figure 7B:
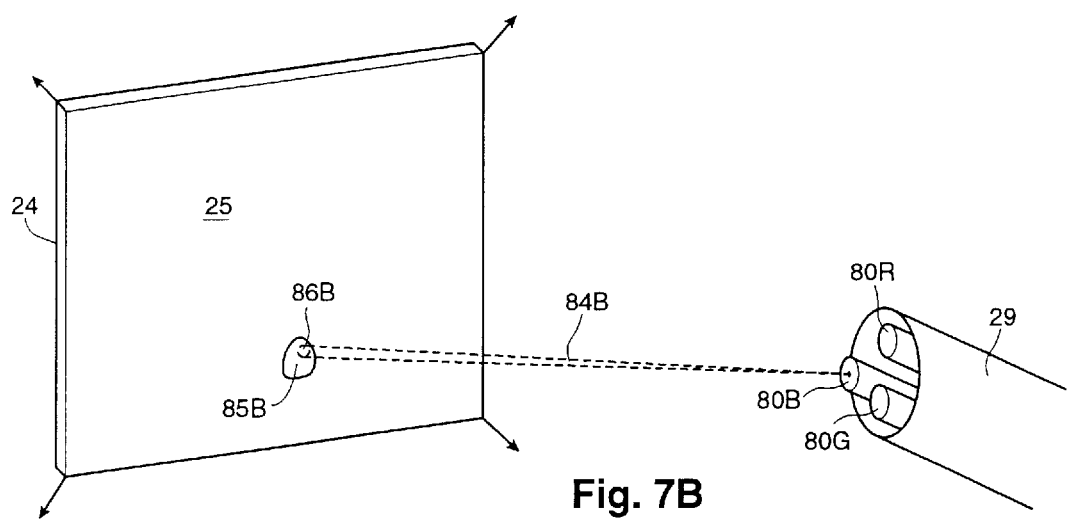
FIG. 7B is a simplified perspective view, similar to FIG. 6, of a portion of the laser light based image projection apparatus of FIG. 1, showing only the narrow diameter laser beam from the blue narrow diameter beam laser.
Figure 7C:
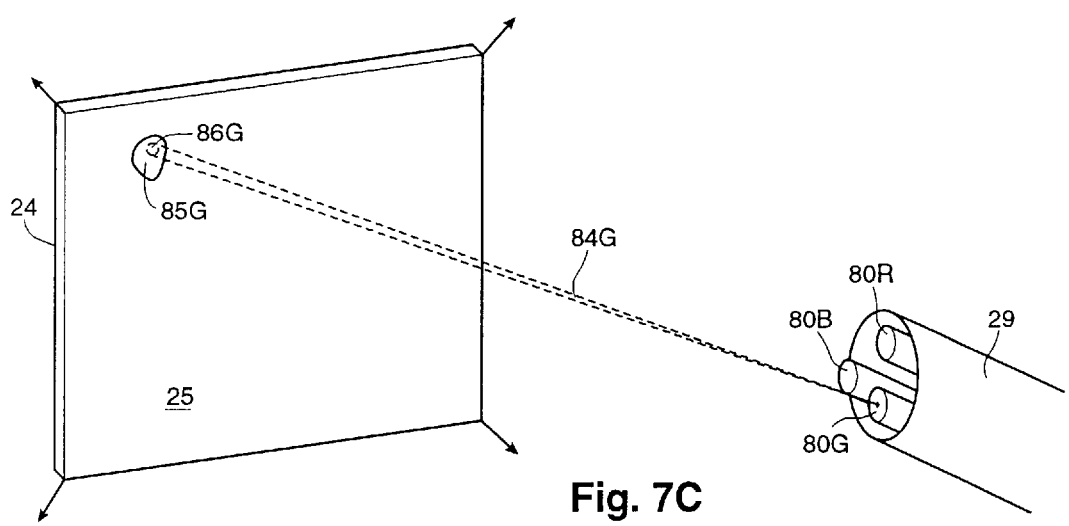
FIG. 7C is a simplified perspective view, similar to FIG. 6, of a portion of the laser light based image projection apparatus of FIG. 1, showing only the narrow diameter laser beam from the green narrow diameter beam laser.
Figure 7D:
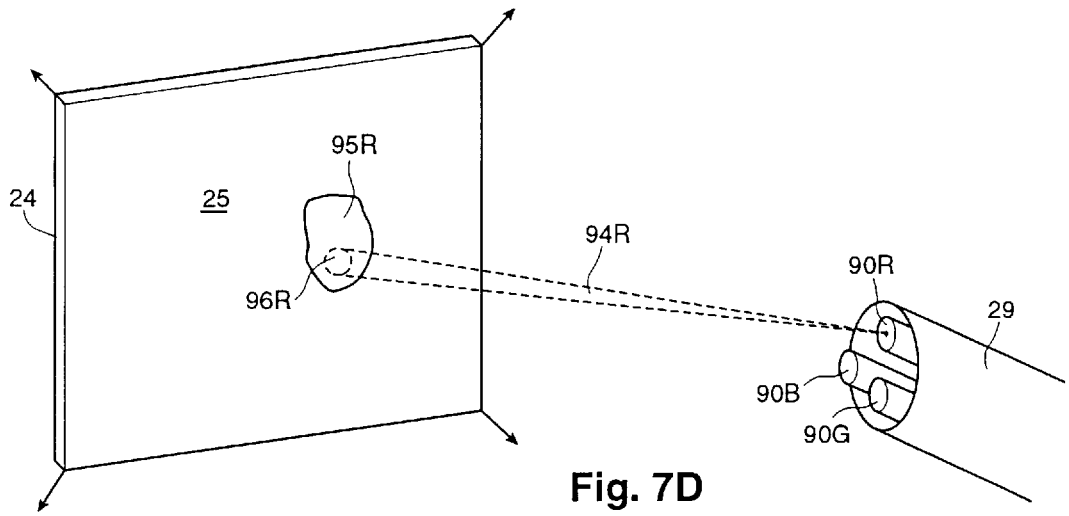
FIG. 7D is a simplified perspective view, similar to FIG. 6, of a portion of the laser light based image projection apparatus of FIG. 1, showing only the optically adjusted wide diameter laser beam from the red wide diameter beam laser.
Figure 7E:
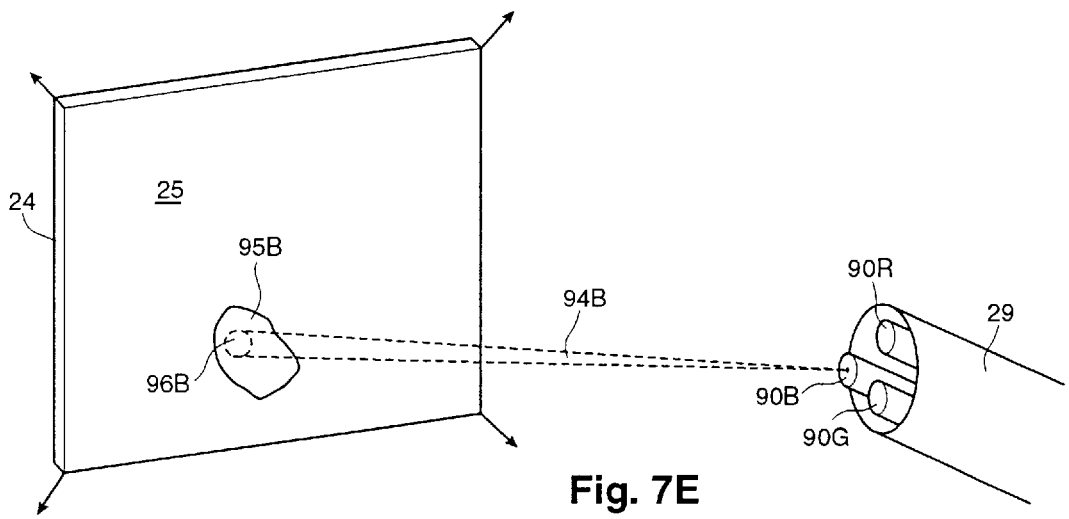
FIG. 7E is a simplified perspective view, similar to FIG. 6, of a portion of the laser light based image projection apparatus of FIG. 1, showing only the optically adjusted wide diameter laser beam from the blue wide diameter beam laser.
Figure 7F:
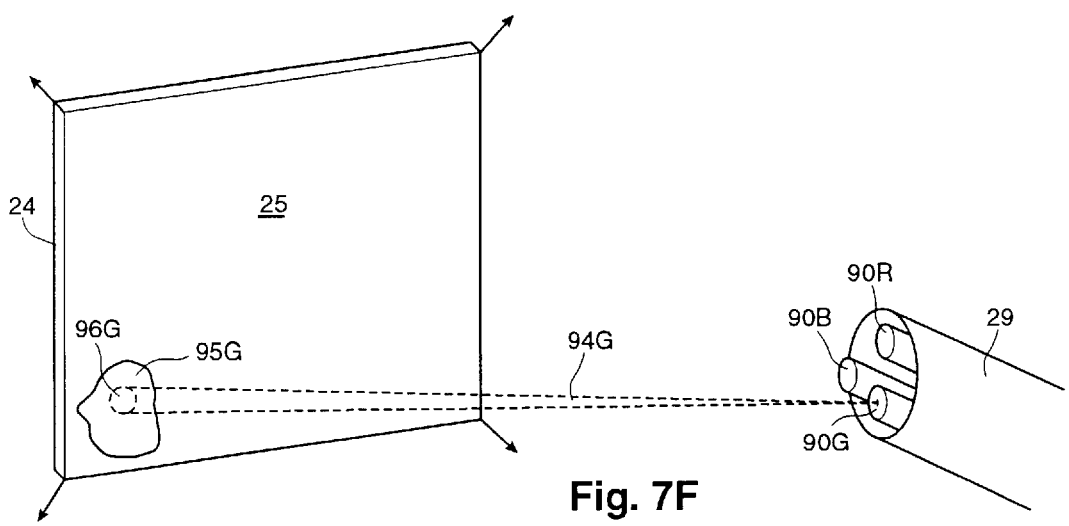
FIG. 7F is a simplified perspective view, similar to FIG. 6, of a portion of the laser light based image projection apparatus of FIG. 1, showing only the optically adjusted wide diameter laser beam from the green wide diameter beam laser.
Figure 7G:
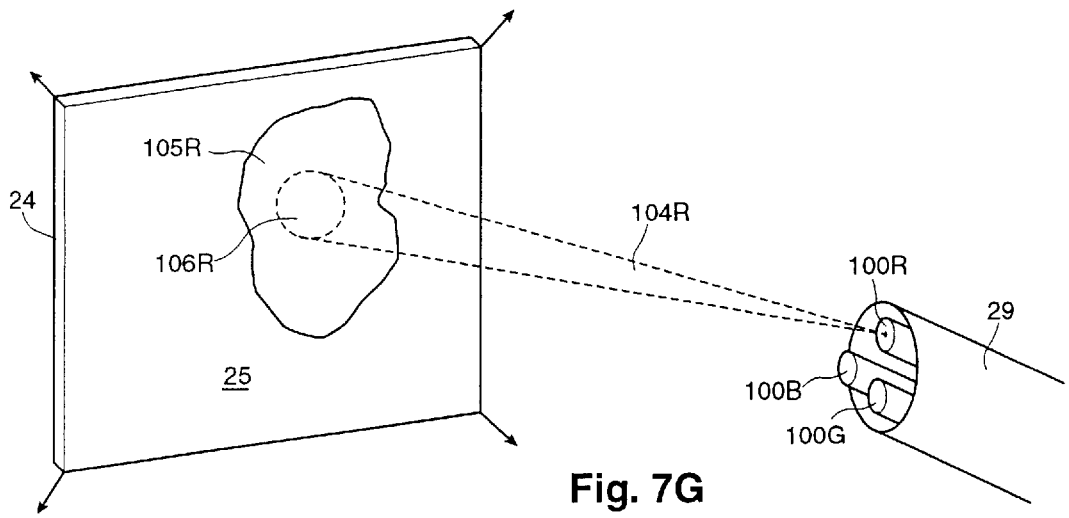
FIG. 7G is a simplified perspective view, similar to FIG. 6, of a portion of the laser light based image projection apparatus of FIG. 1, showing only the optically adjusted very wide diameter laser beam from the red very wide diameter beam laser.
Figure 7H:
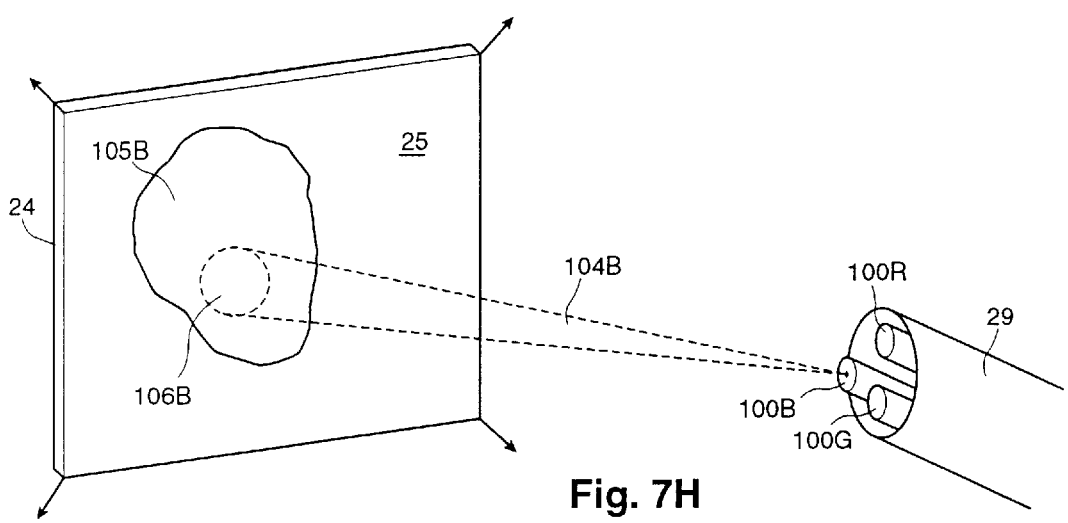
FIG. 7H is a simplified perspective view, similar to FIG. 6, of a portion of the laser light based image projection apparatus of FIG. 1, showing only the optically adjusted very wide diameter laser beam from the blue very wide diameter beam laser.
Figure 7I:
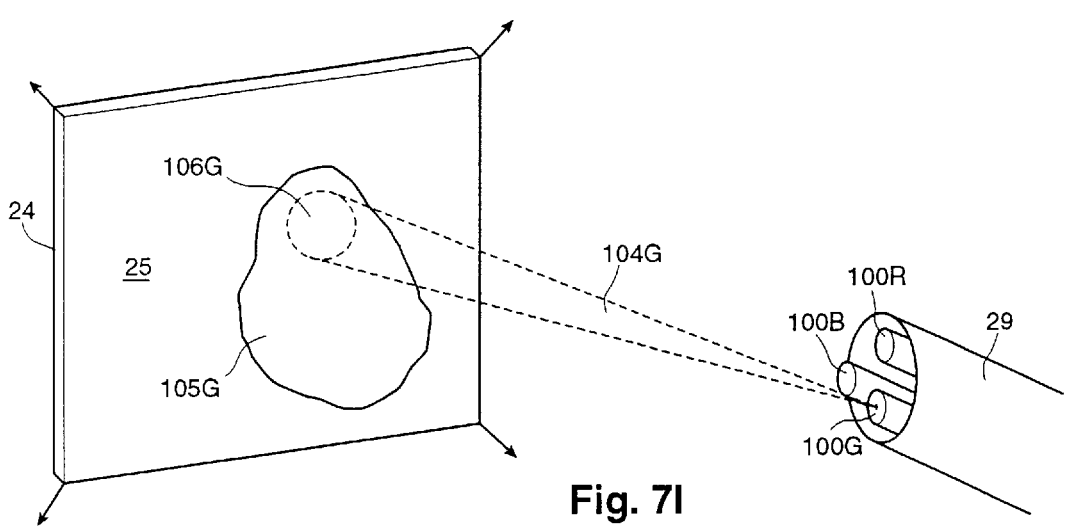
FIG. 7I is a simplified perspective view, similar to FIG. 6, of a portion of the laser light based image projection apparatus of FIG. 1, showing only the optically adjusted very wide diameter laser beam from the green very wide diameter beam laser.

FIG. 7A shows the color daub component 86R formed by the narrow diameter beam red laser 80R. FIG. 7B shows the color daub component 86B formed by the narrow diameter beam blue laser 80B. FIG. 7C shows the color daub component 86G formed by the narrow diameter beam green laser 80G. FIG. 7D shows the color daub component 96R formed by the optically adjusted wide diameter beam red laser 90R. FIG. 7E shows the color daub component 96B formed by the optically adjusted wide diameter beam blue laser 90B. FIG. 7F shows the color daub component 96G formed by the optically adjusted wide diameter beam green laser 90G. FIG. 7G shows the color daub component 106R formed by the optically adjusted very wide diameter beam red laser 100R. FIG. 7H shows the color daub component 106B formed by the optically adjusted very wide diameter beam blue laser 100B. FIG. 7I shows the color daub component 106G formed by the optically adjusted very wide diameter beam green laser 100G. The color daub components 86R, 86B, 86G, 96R, 96B, 96G, 106R, 106B, 106G, are representative of the color daub components 86, 96, 106 produced by the laser light based image projection apparatus 20. As can be best seen in FIG. 6, each of the laser beams 84R, 84B, 84G, 94R, 94B, 94G, 104R, 104B, 104G are dynamically deflected on an ongoing basis by the various laser beam deflectors 120R, 120B, 120G, so as to thereby cause the various corresponding color daub components 86R, 86B, 86G, 96R, 96B, 96G, 106R, 106B, 106G, to move across the viewing screen 24, thus defining corresponding dynamic ranges 85R, 85B, 85G, 95R, 95B, 95G, 105R, 105B, 105G. It can be seen that the color daub components 86R, 86B, 86G, 96R, 96B, 96G, 106R, 106B, 106G, overlap one with another, as necessary, to form full color moving images on the viewing screen 24. In a system having four hundred pods 29, as shown in FIGS. 1–3, there would be 1200 color daub components, which together would form a full color moving image 22 on the viewing screen 24. Shown together and in combination on a temporally successive basis, the color daub components 86, 96, 106 form a series of full color moving images 22, thus permitting full color moving images 22 to be displayed on the viewing screen 24.

The overlap of several lasers from various pods 29 would tend to reduce the phenomenon known as "speckle" that is often associated with coherent laser light that is projected in phase onto a white opaque viewing screen 24. Such overlap would occur as a result of each of the various laser beams 84, 94, 104 being emitted in different angular directions, and thus reducing coherence by reflecting off the non-flat surface 25 of the viewing screen 24 slightly differently than others, and each laser beam 84, 84, 104 originating at a slightly or significantly different distance from any point on the viewing screen, and thus each laser beam 84, 84, 104 being generally out of phase with the other laser beams 84, 84, 104.

Figure 8:
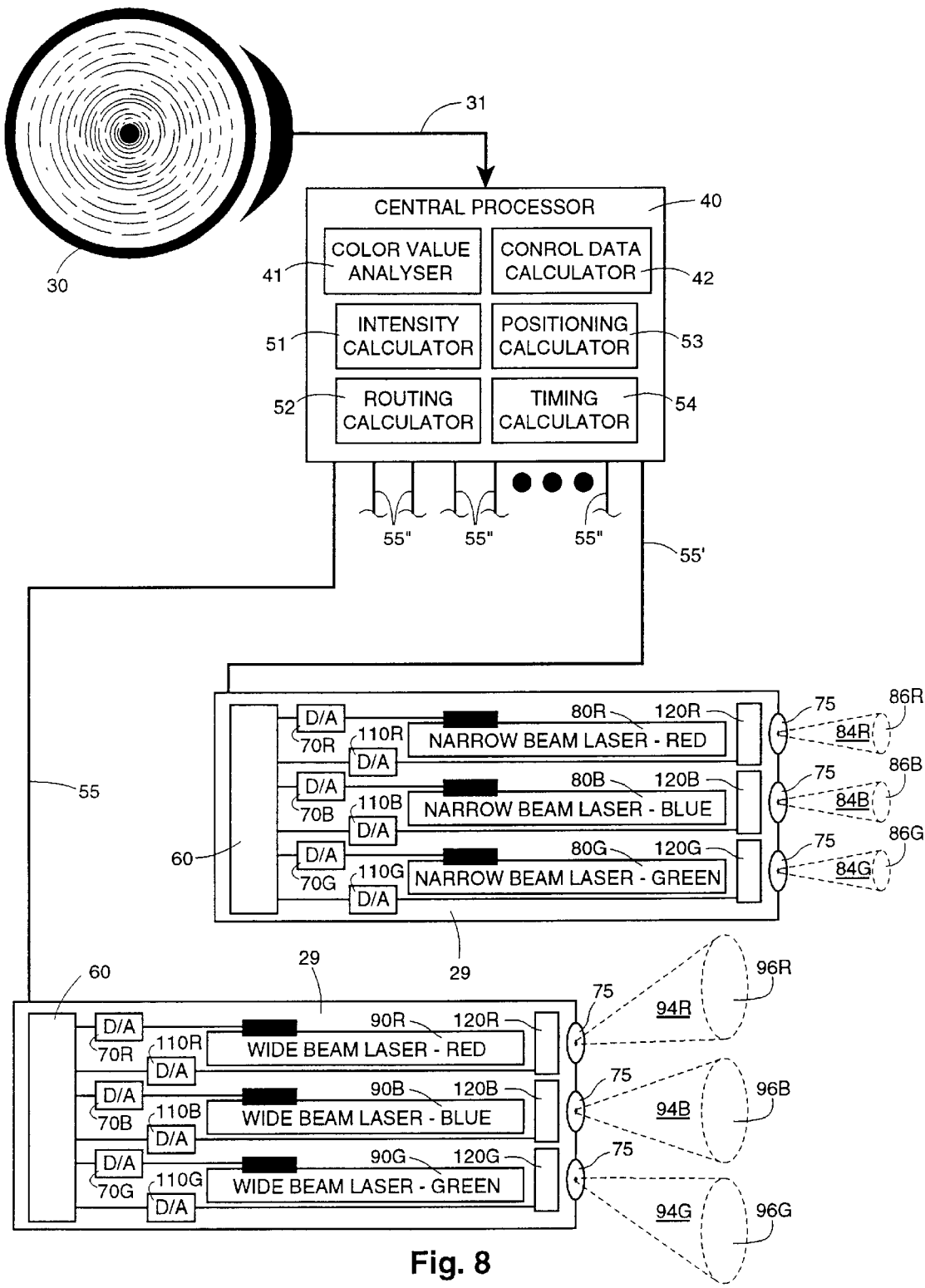
FIG. 8 is a diagrammatic view of an alternative embodiment of the laser light based image projection apparatus of the present invention.

An alternative embodiment of the laser light based image projection apparatus 20, is shown in FIG. 8. This particular embodiment of the present invention is meant for smaller installations such as might be found in a classroom and has a total of perhaps twenty pods 29. For very small applications, the projection apparatus 20 might make use of only two or three pods. In essence, the functions of the group processors 50 are performed by the CPU 40. The pod processors 60 are connected in data communicating relation to the CPU 40. The lasers 80R, 80B, 80G, 90R, 90B, 90G 100R, 100B, and 100G are then operatively connected to the pod processors 60 in the same manner as described in the preferred embodiment. Typically there might be ten pods 29 with narrow diameter beam lasers 80R, 80B, 80G, six pods 29 with optically adjusted wide diameter beam lasers 90R, 90B, 90G, and four pods 29 with optically adjusted very wide diameter beam lasers 100R, 100B, 100G.

It can be seen that increasing the resolution of images on the screen 24 or increasing the overall size of the images may readily be accomplished by merely adding a number of pods 29, typically with some of the additional pods 29 having narrow diameter beam lasers 80R, 80B, 80G, some of the additional pods 29 having optically adjusted wide diameter beam lasers 90R, 90B, 90G, and some of the additional pods 29 having optically adjusted very wide diameter beam lasers 100R, 100B, 100G.

One possible use of the laser light based image projection apparatus 20 of the present invention is that of motion picture viewing. In this case, a motion picture could be recorded by a camera 23 in essentially the same manner as is now done, but preferably with cameras that record originating images in a readily useable digital format. It is also quite possible to take present video or television formats, whether it be North American standard, European standard, Japanese standard, and convert such video data into appropriate digital image data for use with the laser light based image projection apparatus 20 of the present invention. It is also possible to use the laser light based image projection apparatus 20 of the present invention to show a live event that would normally be shown on television or on a "giant screen television" in a sports complex or the like, such as a sporting event or a concert, and so on.

Figure 9:
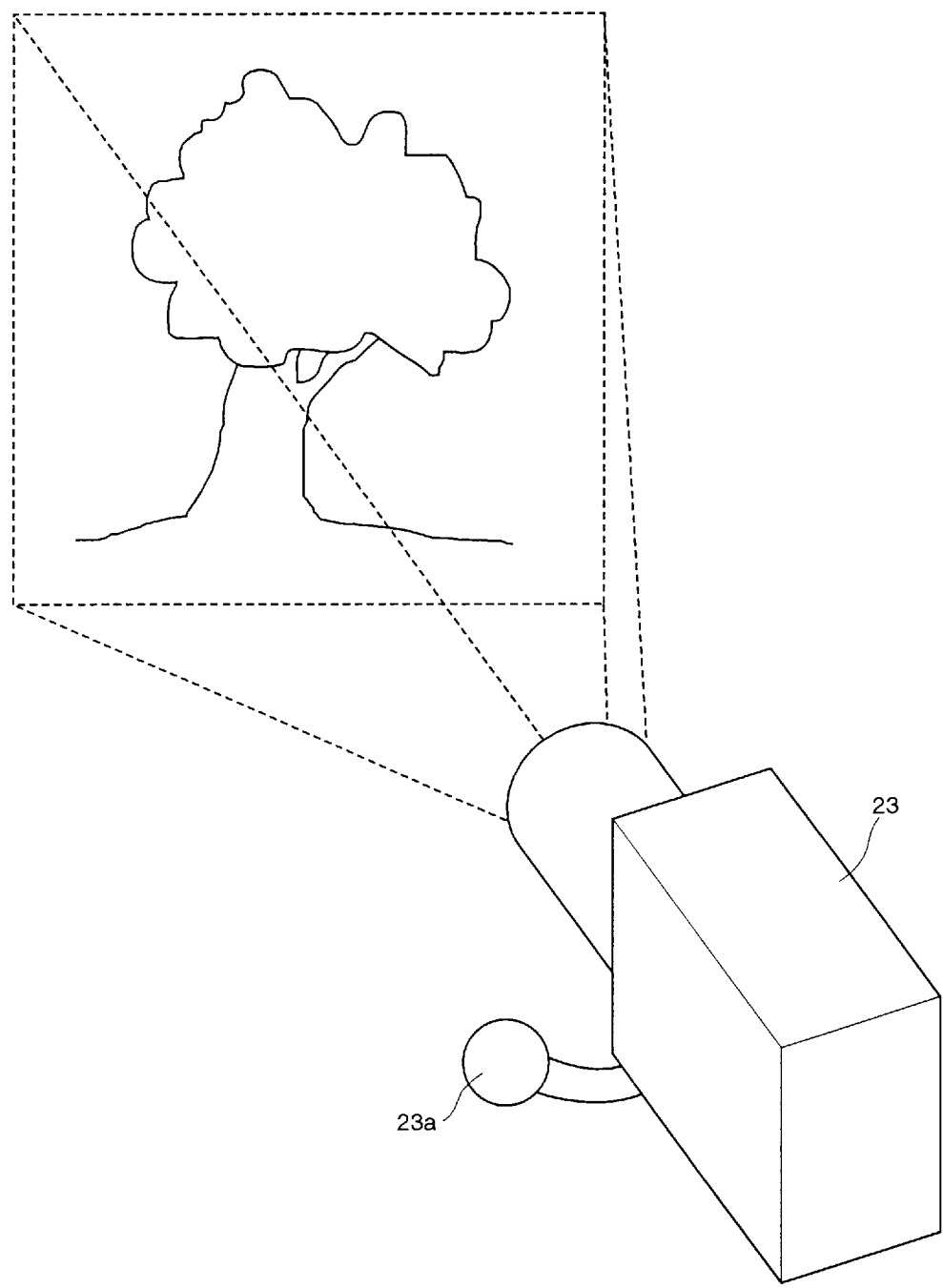
FIG. 9 is a perspective view of a motion picture camera viewing and recording a live video image.

It is contemplated that the laser light based image projection apparatus 20 of the present invention could also comprise a source of audio information in the form of digital data. In the case of recording live video images, as depicted in FIG. 9, audio information could be recorded by a microphone 23a, processed through audio circuitry portions of the camera 23, and recorded as digital data on the same medium as the digital image data. Such audio information could be converted to audio sound at each separate pod 29, or could be transmitted to the remote viewing screen 24 by non-visible laser light, or similar, where the digital data representing audio information could be received and converted into audio sound by a suitable sound system located at the viewing screen 24, which audio sound could conceivably be used to vibrate the video screen 24 in an attempt to further reduce speckle. Alternatively, either in the case of recording live images or in the case of generating full color moving images such as cartoons or computer graphics, the sound could be recorded separately, if appropriate, or could be generated by means of a computer.

It can be seen that there are several advantages of the laser light based image projection apparatus 20 of the present invention over prior art technologies. The present invention uses computer files that can be readily edited at any time. The computer files can be easily stored and transmitted to remote locations, almost instantaneously, if necessary. There is no physical degradation of the computer file, thus preserving perfect quality of the digital image indefinitely. Further, a technical expansion using an interactive display could permit audiences to have input to whatever is being shown. Thus, for instance, endings of movies can be selected or inappropriate scenes can be selectively edited out depending on the age group of the audience.

Another advantage of the laser light based image projection apparatus 20 of the present invention is that it can be embodied on almost any scale so as to project onto a viewing screen anywhere from a few square inches to several thousand square feet, with virtually no loss of quality.

It is also possible to produce randomly generated laser light patterns using random number generators or the like or also to use various data being passed back and forth between local computers as a basis for generating random light patterns. It is also possible to record and store the data that are ultimately used to generate such random light patterns, if desired. It is also possible to generate pseudo-random laser light patterns based on music, using an appropriate algorithm. For example, a digital based recording of a Mozart symphony could be used as a basis for a visual light show. Pseudo-random and graphical type laser light images could also be generated using mathematical formulas and complexity formulas.

It is contemplated that the laser light based image projection apparatus 20 of the present invention could be used to project laser light to produce three dimensional images with appropriate developments in technology in terms of viewing media.

It is further contemplated that the laser light based image projection apparatus 20 of the present invention could use colors of laser other than red, blue, and green, as long as three different colors of lasers are used and with such color laser being separated on a color wheel by appropriate amounts so as to be combinable to form all necessary colors.

Other modifications and alterations may be used in the design and manufacture of the apparatus of the present invention without departing from the spirit and scope of the accompanying claims.

What is claimed is:

1. A laser light based image projection apparatus for projecting full color moving images comprising a plurality of color daub components onto a remote visible-light retransmissive viewing medium, using pluralities of red, blue, and green lasers, each laser emitting a respective red, blue, or green laser light beam, said lasers being arranged in specified groups, said apparatus comprising:

a source of digital image data that provides said digital image data for said full color moving images in the form of inter-related color position co-ordinates and color intensity values at any instant in time;

a conversion computer connected in data communicating relation to said source of said digital image data to receive said digital image data in the form of said inter-related color position co-ordinates and color intensity values from said source;

a color value analyzer within said conversion computer to analyze said color position co-ordinates and color intensity values and to derive therefrom specific red, blue, and green color intensity components and specific red, blue, and green color position co-ordinates;

a control-data calculator within said conversion computer for calculating laser light beam intensity data, laser light beam positioning data, and data distribution addresses, based on said specific red, blue, and green color intensity components and specific red, blue, and green color position co-ordinates, and formatting said calculated data and distribution addresses into distinct data packets;

at least one local computer connected in data communicating relation to said conversion computer for receiving said distinct data packets from said control-data calculator;

an intensity calculator in said at least one local computer for calculating time-based laser intensity control signals based on said received laser light beam intensity data;

a positioning calculator in said at least one local computer for calculating time-based directional control signals based on said received laser light beam positioning data;

a routing calculator in said at least one local computer for determining specific laser addresses based on said received data distribution addresses, so as to direct to specific laser addresses therefor, said time-based laser intensity control signals and said time-based directional control signals, at any instant in time;

a timing calculator in said at least one local computer for calculating projection timing parameters based on said received laser light beam intensity data, said received laser light beam positioning data, and said received data distribution addresses, so as to determine the starting time and the time period of operation of the lasers at each respective laser address, and to communicate time-based laser intensity control signals thereto;

a laser intensity controller connected in data communicating relation to each said at least one local computer for receiving said time-based laser intensity control signals therefrom so as to produce laser actuation signals based on said time-based laser intensity control signals;

narrow diameter beam red, blue, and green lasers, each having a discrete address, connected in electrically conductive relation to each said laser intensity controller so as to receive said laser actuation signals therefrom, each narrow diameter beam laser emitting a narrow diameter laser beam under the control of said laser actuation signals;

optically adjusted wide diameter beam red, blue, and green lasers, each having a discrete address, connected in electrically conductive relation to each said laser intensity controller so as to receive said laser actuation signals therefrom, each optically adjusted wide diameter beam laser emitting an optically adjusted wide diameter laser beam under the control of said laser actuation signals;

a plurality of first digital-to-analogue convertors connected in data communicating relation to each said local computer so as to receive said time-based directional control signals and convert said time-based directional control signals to corresponding analogue directional control signals; and a plurality of laser beam deflectors connected in electrically conductive relation to said first digital-to-analogue convertor so as to receive said analogue directional control signals therefrom and to direct each respective beam of laser light to its intended location on said remote viewing screen, so as to form corresponding color daub components, said color daub components combining together one with another in a generally overlapping manner, thus forming said full color moving images.

2. The laser light based image projection apparatus of claim 1, wherein said laser intensity controller comprises a plurality of second digital-to-analogue convertors and said laser actuation signals are analogue signals.

3. The laser light based image projection apparatus of claim 1, wherein said at least one local computer comprises a plurality of intermediately connected routing microcomputers and a plurality of laser-controlling microcomputers connected in data communicating relation to each of said plurality of intermediately connected routing microcomputers.

4. The laser light based image projection apparatus of claim 1, further comprising optically adjusted very wide diameter beam red, blue, and green lasers, each having a discrete address, connected in electrically conductive relation to each said laser intensity controller so as to receive said laser actuation signals therefrom, each optically adjusted very wide diameter beam laser emitting an optically adjusted very wide diameter laser beam under the control of said laser actuation signals.

5. The laser light based image projection apparatus of claim 1, further comprising a source of audio information in the form of digital data.

6. The laser light based image projection apparatus of claim 1, wherein said remote visible-light retransmissive viewing medium comprises a viewing screen.

7. A method of projecting full color moving images comprising a plurality of color daub components onto a remote visible-light retransmissive viewing screen, using pluralities of red, blue, and green lasers, each laser emitting a respective red, blue, or green laser light beam, said lasers being arranged in specified groups, said method comprising the steps of:

providing said digital image data for said full color moving images in the form of inter-related color position co-ordinates and color intensity values at any instant in time;

receiving into a conversion computer said digital image data in the form of said inter-related color position co-ordinates and color intensity values from said source;

analyzing said color position co-ordinates and color intensity values and to derive therefrom specific red, blue, and green color intensity components and specific red, blue, and green color position co-ordinates;

calculating laser light beam intensity data, laser light beam positioning data, and data distribution addresses, based on said specific red, blue, and green color intensity components and specific red, blue, and green color position co-ordinates, and formatting said calculated data and distribution addresses into distinct data packets;

receiving into at least one local computer said distinct data packets from said control-data calculator;

calculating time-based laser intensity control signals based on said received laser light beam intensity data;

calculating time-based directional control signals based on said received laser light beam positioning data;

determining specific laser addresses based on said received data distribution addresses, so as to direct to specific laser addresses therefor, said time-based laser intensity control signals and said time-based directional control signals, at any instant in time;

calculating projection timing parameters based on said received laser light beam intensity data, said received laser light beam positioning data, and said received data distribution addresses, so as to determine the starting time and the time period of operation of the lasers at each respective laser address, and to communicate time-based laser intensity control signals thereto;

receiving into a laser intensity controller said time-based laser intensity control signals therefrom so as to produce laser actuation signals based on said time-based laser intensity control signals;

receiving into narrow diameter beam red, blue, and green lasers, each having a discrete address, said laser actuation signals, and actuating each of said narrow diameter beam lasers so as to emit a narrow diameter laser beam under the control of said laser actuation signals;

receiving into optically adjusted wide diameter beam red, blue, and green lasers, each having a discrete address, said laser actuation signals, and actuating each of said optically adjusted wide diameter beam lasers so as to emit an optically adjusted wide diameter laser beam under the control of said laser actuation signals;

receiving into first digital-to-analogue convertors said time-based directional control signals and converting said time-based directional control signals to corresponding analogue directional control signals; and receiving into laser beam deflectors said analogue directional control signals therefrom, and directing, using said laser beam deflector, each respective beam of laser light to its intended location on said remote viewing screen, so as to form corresponding color daub components, said color daub components combining together one with another in a generally overlapping manner, thus forming said full color moving images.

8. The method of claim 7, further comprising the step of receiving into second digital-to-analogue convertors said time-based laser intensity control signals and converting said time-based laser intensity control signals to corresponding analogue laser actuation signals.

9. The method of claim 7, further comprising the step of receiving into optically adjusted very wide diameter beam red, blue, and green lasers, each having a discrete address, said laser actuation signals, and actuating each of said optically adjusted very wide diameter beam lasers so as to emit an optically adjusted very wide diameter laser beam under the control of said laser actuation signals.

10. The method of claim 7, further comprising the step of providing a source of audio information in the form of digital data.

* * * * *